United States Patent Office 3,646,083
Patented Feb. 29, 1972

3,646,083
LEAD ORTHOMERCAPTOPHENOL SALT
Emil J. Geering, Grand Island, and George B. Stratton, Lewiston, N.Y., assignors to Hooker Chemical Corporation, Niagara Falls, N.Y.
No Drawing. Continuation-in-part of application Ser. No. 666,914, Sept. 11, 1967. This application Dec. 31, 1969, Ser. No. 889,706
Int. Cl. C07f 7/24
U.S. Cl. 260—435 R
10 Claims

ABSTRACT OF THE DISCLOSURE

This invention relates to ortho-substituted phenol lead salts which have a stabilizing action on polyvinyl chloride, and which also impart a stable yellow coloration thereto, of which typical structural formulae are as follows:

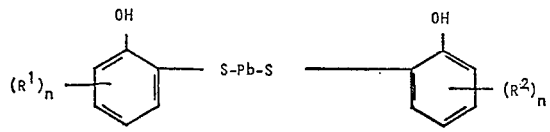

in which $R^1$ and $R^2$ represent substituents and each $n$ is independently an integer from 0 to 4.

REFERENCE TO RELATED APPLICATIONS

This application is a continuation-in-part of Ser. No. 666,914, filed Sept. 11, 1967, now abandoned.

BACKGROUND OF THE INVENTION

This invention is directed to lead salts of orthomercaptophenols, and their use as a yellow pigment and/or as a stabilizer in a polymer such as polyvinyl chloride.

Basic lead salts of various kinds as stabilizing agents for vinyl resin compositions are well known in the art. Typical lead salts include such compounds as dibasic lead phthalate, dibasic lead phosphite, basic carbonate white lead, basic silicate white lead, tribasic lead sulfate, as well as a basic lead salt of an aromatic polycarboxylic acid having from three to six carboxyl groups substituted on a benzene ring, for example. Typical examples of the latter type compound are basic lead salts of compounds such as trimellitic, trimesic, hemimellitic, pyromellitic, mellophanic, prehnitic, benzene pentacarboxylic and mellitic acids for example, including monobasic, dibasic, tribasic, tetrabasic, or pentabasic salts. The latter compounds are in fact suitable for employment in polyvinyl resin compositions such as polyvinyl chloride polymer.

Also, there are salts of other metals known to be stabilizing agents for resins, such as the tin mercaptobenzylalcohol of U.S. Pat. 2,885,415.

Although many of the above types of stabilizers are desirable for particular types of composition, and although any one or more of the known stabilizers may well have some advantage over other stabilizers, there is still a demand for improved stabilizers and particularly a demand for stabilizers which can be produced at a low cost.

Although there are many known pigments for imparting coloration to various compounds, it is particularly desirable to obtain pigments which do not have an adverse effect on the compound to which it is added, particularly when being employed as a part of a polymer composition such as polyvinyl chloride. It is also desirable that a pigment impart some additional advantageous desirable property to the composition, in addition to the imparting of a stable color not readily subject to discoloration.

An object of this invention is novel compounds characterized by superior stabilizing action when used as a part of a polymeric composition such as polyvinyl chloride.

Another object of this invention is novel compounds characterized by stable color and suited for use as a pigment for imparting yellow coloring to compositions such as polyvinyl chloride.

Another object is novel compounds fulfilling one or more of the above objects, and characterized by a low cost of production.

Other objects become apparent from the above and following disclosure.

DESCRIPTION OF THE INVENTION

The above objects are unexpectedly fulfilled by the discovery of novel compounds, lead salts of phenolic derivatives, produced by a typical process comprising, for example, reacting in an inert atmosphere, (a) an orthomercaptophenol (HS—$C_6H_4$—OH), in an aqueous solution of sodium hydroxide and (b) a solution of lead acetate, to form a precipitate normally yellow in color, having an empirical formula of $PbC_{12}H_{10}O_2S_2$ as based on percent composition: Pb—45.3%; S—14.0%. The compound formed as at least the major part of the precipitate is a bivalent lead compound being the lead salt of an orthomercaptophenol of the formula:

(I)  $HOR^1$—S—Pb—S—$R^2$—OH in which $R^1$ and $R^2$ are orthoarylene radicals selected from the group consisting of naphthylene, anthrylene and groups of the formula:

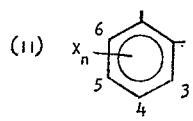

in which $n$, substituents X appear in the ring positions 3, 4, 5 and 6, X being independently selected from the group consisting of —H, alkyl of 1–20 carbon atoms, alkenyl of 2–20 carbon atoms, alkynyl of 2–20 carbon atoms, alkoxy of 1–20 carbon atoms, aryl of 6–14 carbon atoms, haloaryl of 6–14 carbon atoms, aralkyl of 7–15 carbon atoms, haloaralkyl of 7–15 carbon atoms, cycloalkyl of 3–6 carbon atoms, halocycloalkyl of 3–6 carbon atoms, aryloxy of 6–14 carbon atoms, hydroxy and halo groups, and $n$ is an integer from 1 to 4.

The preferred compound of Formula I are those in which $n$ in Formula II is an integer from 1 to 2.

The most preferred compound of this invention are those in which the substituents X in Formula II are independently selected from the group consisting of —H, lower alkyl, aryl of 6 to 10 carbon atoms, lower alkoxy, hydroxy and halo groups, and n is an integer of 1 to 2.

Examples of reactants of the formula

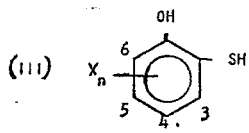

in which n is 4 are 3,4,5,6-tetramethyl, tetrahydroxy, tetramethoxy and tetrabromo ortho-mercapto phenols.

Examples of reactants of Formula III in which n is 3 are 3,5-dimethyl-6-eicosyl-, 3,4,5-trichloro-, and 3,5-dichloro-4-hydroxyortho-mercapto phenols.

Examples of reactants of Formula III in which n is 2 are 4,6-dimethyl-, 3,5-dioxtyl-, 4,6-dihexadecyl-, 4-methyl-6-t-butyl-, 3,5-dipropenyl-, 4- α-propenyl-6-methoxy, 3,5-dioxtoxy-, 4-vinyl-6-bromo, 4,6-diethynyl-, 3,5-diphenyl-, 3,5-diphenoxy-, 4,6-diphenoxy-, 4-phenoxy-6-methyl-, 4,6-dibenzyl-, 4-benzyl-6-chloro- and 3,5-dicyclopentyl-ortho-mercapto phenols.

Examples of reactants of Formula III in which n is 1 are 4-methyl-, 4-t-octyl-, 6-dodecyl-, 6-t-butyl-, 3-eicosyl-, 4-methoxy-, 6-octoxy-, 4-vinyl-, 4-propenylnonylmethyl-, 4-α-propenyl-, 6-ethynyl-, 6-(4-nonene-1-ynyl)-, 5-(hexadec - 16 - ynyl)-, 4-phenyl-, 4 - (2 - naphthyl)-, 4-(1-anthracyl-, 4 - pentabromophenyl-, 3 - cyclohexyl-, 4-cyclohexyl-, 5 - pentachlorocyclohexyl-, 6 - phenoxy-, 4-(1-napthoxy)-, 5 - xylyl-, 5 - (naphthylmethyl)-, 5-(orthochlorobenzyl)-, 3-hydroxy-, 4-hydroxy-, 5-hydroxy-, 6-hydroxy-, 4-chloro-, 6-bromo-, and 3 - chloro - orthomercapto phenols.

Furthermore, ortho-mercaptophenol, 2 - mercapto-1-naphthol and 2 - hydroxy - 1 - mercapto-anthracene represent non-substituted reactants for the production of the 1:2 lead salts of the instant invention.

The compounds of this invention are bis(2-hydroxyaryl) lead mercaptides in which the aryl group may be substituted by the groups and in the ring positions indicated in Formula II supra. The products derived from the representative reactants given supra are:

bis(2-hydroxyphenyl)lead mercaptide;
bis[2-(1-hydroxy)naphthyl]lead mercaptide;
bis[1-(2-hydroxy)anthracyl]lead mercaptide;
bis(2-hydroxy-3,4,5,6-tetramethylphenyl)lead mercaptide;
bis(2-hydroxy-3,4,5,6-tetramethoxyphenyl)lead mercaptide;
bis(2-hydroxy-3,4,5,6-tetrahydroxyphenyl)lead mercaptide;
bis(2-hydroxy-3,4,5,6-tetrabromophenyl)lead mercaptide;
bis(2-hydroxy-5,6-dimethyl-3-eicosyl-phenyl)lead mercaptide,
bis(2-hydroxy-4,5,6-trichlorophenyl)lead mercaptide,
bis(2-hydroxy-4,6-dichloro-5-hydroxyphenyl)lead mercaptide,
bis(2-hydroxy-3,5-dimethylphenyl)lead mercaptide,
bis(2-hydroxy-4,6-dioctylphenyl)lead mercaptide,
bis(2-hydroxy-3,5-dihexadecylphenyl)lead mercaptide,
bis(2-hydroxy-3-t-butyl-5-methylphenyl)lead mercaptide;
bis(2-hydroxy-4,6-dipropenylphenyl)lead mercaptide,
bis(2-hydroxy-5-α-propenyl-3-methoxyphenyl)lead mercaptide,
bis(2-hydroxy-4,6-dioctoxyphenyl)lead mercaptide,
bis(2-hydroxy-5-vinyl-3-bromophenyl)lead mercaptide,
bis(2-hydroxy-3,5-diethynylphenyl)lead mercaptide,
bis(2-hydroxy-4,6-diphenylphenyl)lead mercaptide,
bis(2-hydroxy-4,6-diphenoxyphenyl)lead mercaptide,
bis(2-hydroxy-3,5-diphenoxyphenyl)lead mercaptide,
bis(2-hydroxy-5-phenoxy-3-methylphenyl)lead mercaptide,
bis(2-hydroxy-3,5-dibenzylphenyl)lead mercaptide,
bis(2-hydroxy-5-benzyl-3-chlorophenyl)lead mercaptide,
bis(2-hydroxy-4,6-dicyclopentylphenyl)lead mercaptide,
bis(2-hydroxy-5-methylphenyl)lead mercaptide,
bis(2-hydroxy-5-t-octylphenyl)lead mercaptide,
bis(2-hydroxy-3-t-butylphenyl)lead mercaptide,
bis(2-hydroxy-3-dodecylphenyl)lead mercaptide,
bis(2-hydroxy-6-eicosylphenyl)lead mercaptide,
bis(2-hydroxy-5-methoxyphenyl)lead mercaptide,
bis(2-hydroxy-3-octoxyphenyl)lead mercaptide,
bis(2-hydroxy-5-vinylphenyl)lead mercaptide,
bis(2-hydroxy-5-propenylnonylmethyl-phenyl)lead mercaptide,
bis(2-hydroxy-5-α-propenylphenyl)lead mercaptide,
bis(2-hydroxy-3-ethynylphenyl)lead mercaptide,
bis(2-hydroxy-3-(4-nonene-1-ynyl)phenyl)lead mercaptide,
bis(2-hydroxy-4-(hexadec-16-ynyl-phenyl)lead mercaptide,
bis(2-hydroxy-5-phenylphenyl)lead mercaptide,
bis(2-hydroxy-5-(2-naphthyl)phenyl)lead mercaptide,
bis(2-hydroxy-5-(1-anthracyl)phenyl)lead mercaptide,
bis(2-hydroxy-5-pentabromophenyl-phenyl)lead mercaptide,
bis(2-hydroxy-6-cyclohexylphenyl)lead mercaptide,
bis(2-hydroxy-5-cyclohexylphenyl)lead mercaptide,
bis(2-hydroxy-4-(pentachlorocyclohexyl)phenyl)lead mercaptide,
bis(2-hydroxy-3-phenoxyphenyl)lead mercaptide,
bis(2-hydroxy-5-(1-napthoxy)phenyl)lead mercaptide,
bis(2-hydroxy-4-xylylphenyl)lead mercaptide,
bis(2-hydroxy-4-(naphthylmethylphenyl)lead mercaptide,
bis(2-hydroxy-4-(ortho-chlorobenzyl)phenyl)lead mercaptide,
bis(2,3-dihydroxyphenyl)lead mercaptide,
bis(2,4-dihydroxyphenyl)lead mercaptide,
bis(2-hydroxy-2,5-dihydroxyphenyl)lead mercaptide,
bis(2-hydroxy-2,6-dihydroxyphenyl)lead mercaptide,
bis(2-hydroxy-5-chlorophenyl)lead mercaptide,
bis(2-hydroxy-3-bromophenyl)lead mercaptide, and
bis(2-hydroxy-6-chlorophenyl)lead mercaptide.

A typical use of the compound of this invention is as a part of a composition comprising a polyvinyl halide polymer such as polyvinyl chloride polymer having substantially improved stability, as a result of the inclusion of at least a stabilizing amount of a stabilizing compound described above. In the preferred polyvinyl halide compositions, the stabilizer is included in an amount ranging from about 0.1 percent to about 5 percent or more by weight.

As noted above, some of the novel stabilizing compounds of this invention are also characterized by a distinguishing yellow color which is not readily subject to discoloration, and are useful as improved pigment forms imparting yellow coloration to a composition such as polyvinyl chloride, for example. The intensity of color imparted is dependent upon the concentration of the pigment.

The novel stabilizing and pigment compound of this invention is not limited merely to polymers of polyvinyl halide or polyvinyl chloride, for example, but may be used in other equivalent polymers, especially in copolymer combinations such as copolymer of polyvinyl chloride and polyvinyl acetate, for example.

In the process described above for the production of the novel compounds of this invention, it should be noted that any one or more basic materials in aqueous solution may be employed, such as sodium hydroxide, potassium hydroxide, calcium hydroxide, ammonium hydroxide, and the like. Similarly, any conventional lead salts having at least a limited degree of solubility (i.e., substantially soluble), preferably highly soluble, such as organic lead salts or hydrates thereof may be employed. Typical salts include salts such as lead persulfate, lead dithionate, lead oxalate, lead butyrate, lead propionate, and lead acetate, the acetate being the preferred salt. It is readily apparent that except for solubility during reaction, the nature of the anion employed to solubilize the lead is not a critical element of the preparation and the anion does not appear as a contaminant in the novel compositions of this invention.

The unexpectedly superior results obtained as a stabilizer by the employment of the novel lead compounds of this invention is readily illustrated by comparison with a tin salt of an analogous structure, the tin salt having little or no utility as a stabilizer. Examples illustrating this are included below.

The following examples are given solely by way of illustration of various embodiments of this invention and to illustrate the superiority of the results obtained from various embodiments of this invention, and accordingly, the following examples are not intended to limit the scope of this invention except insofar as the appended claims are limited and except insofar as is otherwise specifically stated in the preceding and following disclosure. All parts are by weight unless otherwise stated.

EXAMPLE I

Preparation of non-cyclic lead salt of o-mercaptophenol

During a 15 minute period a solution of 37.9 g. of lead acetate dihydrate (0.1 mole) in 100 ml. of water was added to a well-stirred and nitrogen-purged solution of 25.2 g. of o-mercaptophenol (0.2 mole), 8 g. of sodium hydroxide (0.2 mole) and 100 ml. of water. The resulting yellow slurry was stirred for one hour and then filtered. After reslurrying and filtering the product three times it was collected and dried over anhydrous $CaCl_2$. It weighed 47 g.

Analysis.—Calc'd percentages for $C_{12}H_{10}O_2S_2Pb$ (percent): S, 14.0; Pb, 45.2; hydroxyl, 7.4. Found (percent): S, 13.1; Pb, 46.3; hydroxyl, 6.9.

EXAMPLE II

Mixtures containing 50 g. of polyvinylchloride, 16.5 g. of dioctyl phthalate and 0.13 g. of stearic acid were combined with 0.5 g. of the following stabilizer candidates. These compositions were compound on a two-roll rubber mill and then heated at 177° C. for 10 minutes. The compounds are listed in order of decreasing stabilizing effect in Table I.

EXAMPLE III

Acyclic lead salt of 2-mercapto-4-t-octylphenol

To a solution of 25 g. of 2-mercapto-4-t-octylphenol (0.1 mole) and 4.0 g. of sodium hydroxide (0.1 mole) in 100 ml. of water is added dropwise 19 g. of lead acetate trihydrate (0.05 mole). The resulting slurry is stirred one half hour and is then filtered. The product is washed thoroughly with water and dried. The product, a yellow powder, weighs about 35 g. A typical analysis is shown:

Analysis.—Calc'd for $C_{28}H_{42}OPbS_2$ (percent): Pb, 29.4; S, 9.1; phenolic hydroxy 4.84. Found (percent): Pb, 27.7; S, 8.4; phenolic hydroxy 4.88.

TABLE I

| Compound | Composition | |
|---|---|---|
| | Color | Strength |
| Bis(2-hydroxyphenyl) lead mercaptide | Bright yellow | Tough. |
| Bis(2-hydroxyphenyl) mercury mercaptide | Dark tan | Tough. |
| 1,3,2-benzoxathiadibutylstannole | Dark tan | Tough. |
| 2,2'-spirobi[1,3,2-benzooxathiastannole] | Black | Crumbly. |
| 5-t-octyl-1,3,2-benzooxathiastannile | Black | Crumbly. |
| 1,3,2-benzooxathiastannile | Black | Crumbly. |

The samples of Table I containing a lead-compound stabilizer of this invention showed less degradation than either the control or the sample containing the tin compound.

What is claimed is:

1. A compound $HOR^1$—S—Pb—S—$R^2$—OH in which $R^1$ and $R^2$ are radicals of the formula

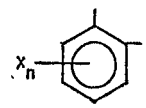

in which X represents a member independently selected from the group consisting of —H, lower alkyl, aryl of 6 to 10 carbon atoms, lower alkoxy, hydroxy and halo groups, and $n$ is an integer of 1–2.

2. A compound according to claim 1 which is bis(2-hydroxyphenyl) lead mercaptide.

3. A compound according to claim 1 which is bis(2-hydroxy-5-t-octylphenyl) lead mercaptide.

4. A compound according to claim 1 which is bis(2,5-dihydroxyphenyl) lead mercaptide.

5. A compound according to claim 1 is bis(2,3-dihydroxyphenyl) lead mercaptide.

6. A compound according to claim 1 which is bis(2-hydroxy-3-t-butyl-phenyl) lead mercaptide.

7. A compound according to claim 1 which is bis(2-hydroxy-5-vinyl-phenyl) lead mercaptide.

8. A compound according to claim 1 which is bis(2,4-dihydroxyphenyl) lead mercaptide.

9. A compound according to claim 1 which is bis(2,6-dihydroxyphenyl) lead mercaptide.

10. A compound according to claim 1 which is bis(2-hydroxy-3-t-butyl-5-methyl-phenyl) lead mercaptide.

References Cited

UNITED STATES PATENTS

| 2,197,835 | 4/1940 | Reiff. |
| 2,515,129 | 7/1950 | Lieber. |
| 2,795,549 | 6/1957 | Abbott et al. |

TOBIAS E. LEVOW, Primary Examiner

H. M. S. SNEED, Assistant Examiner

U.S. Cl. X.R.

260—45.75 R